US012718324B2

(12) United States Patent
Xia et al.

(10) Patent No.: US 12,718,324 B2
(45) Date of Patent: Aug. 25, 2026

(54) METHOD, COMPUTER-READABLE MEDIUM, AND ELECTRONIC DEVICE FOR IMAGE TEXT RECOGNITION

(71) Applicant: TENCENT TECHNOLOGY (SHENZHEN) COMPANY LIMITED, Shenzhen (CN)

(72) Inventors: Leihao Xia, Shenzhen (CN); Ping Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 396 days.

(21) Appl. No.: 18/354,726

(22) Filed: Jul. 19, 2023

(65) Prior Publication Data

US 2023/0360183 A1 Nov. 9, 2023

Related U.S. Application Data

(63) Continuation of application No. PCT/CN2022/118298, filed on Sep. 13, 2022.

(30) Foreign Application Priority Data

Nov. 5, 2021 (CN) ......................... 202111307156.0

(51) Int. Cl.
*G06T 7/10* (2017.01)
*G06T 5/30* (2006.01)
(Continued)

(52) U.S. Cl.
CPC .................. *G06T 5/30* (2013.01); *G06T 5/70* (2024.01); *G06T 7/10* (2017.01); *G06V 10/56* (2022.01);
(Continued)

(58) Field of Classification Search
CPC .... G06T 5/30; G06T 5/70; G06T 7/10; G06V 10/56; G06V 10/806; G06V 30/153;
(Continued)

(56) References Cited

U.S. PATENT DOCUMENTS

2013/0272607 A1 10/2013 Chattopadhyay et al.
2017/0270642 A1* 9/2017 Wada ........................ G06T 5/30
(Continued)

FOREIGN PATENT DOCUMENTS

CN 104156706 A 11/2014
CN 105426825 A 3/2016
(Continued)

OTHER PUBLICATIONS

The World Intellectual Property Organization (WIPO) International Search Report for PCT/CN2022/118298 Nov. 16, 2022 5 Pages (including translation).

(Continued)

*Primary Examiner* — Huo Long Chen
(74) *Attorney, Agent, or Firm* — Anova Law Group, PLLC

(57) ABSTRACT

An image text recognition method includes converting an image into a grayscale image, and segmenting, according to layer intervals to which grayscale values of pixels in the grayscale image belong, the grayscale image into grayscale layers with one corresponding to a layer interval, performing image erosion on a grayscale layer to obtain a feature layer corresponding to the grayscale layer, the feature layer including at least one connected region; overlaying feature layers to obtain an overlaid feature layer, the overlaid feature layer including connected regions; dilating connected regions on the overlaid feature layer according to a preset direction to obtain text regions; and performing text recognition on the text regions on the overlaid feature layer to obtain a recognized text corresponding to the image.

9 Claims, 14 Drawing Sheets

(51) Int. Cl.
*G06T 5/70* (2024.01)
*G06V 10/56* (2022.01)
*G06V 10/80* (2022.01)
*G06V 30/148* (2022.01)

(52) U.S. Cl.
CPC .......... *G06V 10/806* (2022.01); *G06V 30/153* (2022.01)

(58) Field of Classification Search
CPC ...... G06V 10/82; G06V 30/10; G06V 30/148; G06V 30/16; G06V 30/24
See application file for complete search history.

(56) References Cited

U.S. PATENT DOCUMENTS

| | | | | |
|---|---|---|---|---|
| 2021/0279212 | A1 | 9/2021 | Kazmi et al. | |
| 2021/0406616 | A1* | 12/2021 | Yang | G06N 3/045 |

FOREIGN PATENT DOCUMENTS

| | | | | | |
|---|---|---|---|---|---|
| CN | 108985324 | A | * 12/2018 | G06F 18/214 |
| CN | 109002756 | A | 12/2018 | |
| CN | 109034147 | A | * 12/2018 | G06N 3/045 |
| CN | 109102037 | A | 12/2018 | |
| CN | 109255499 | A | * 1/2019 | G06Q 10/103 |
| CN | 109461494 | A | 3/2019 | |
| CN | 110097046 | A | 8/2019 | |
| CN | 110222694 | A | 9/2019 | |
| JP | 2002279344 | A | 9/2002 | |
| WO | 2020000688 | A1 | 1/2020 | |

OTHER PUBLICATIONS

China National Intellectual Property Administration (CNIPA) Office Action 1 for Application No. 202111307156.0 Sep. 19, 2025 10 Pages (including translation).

* cited by examiner

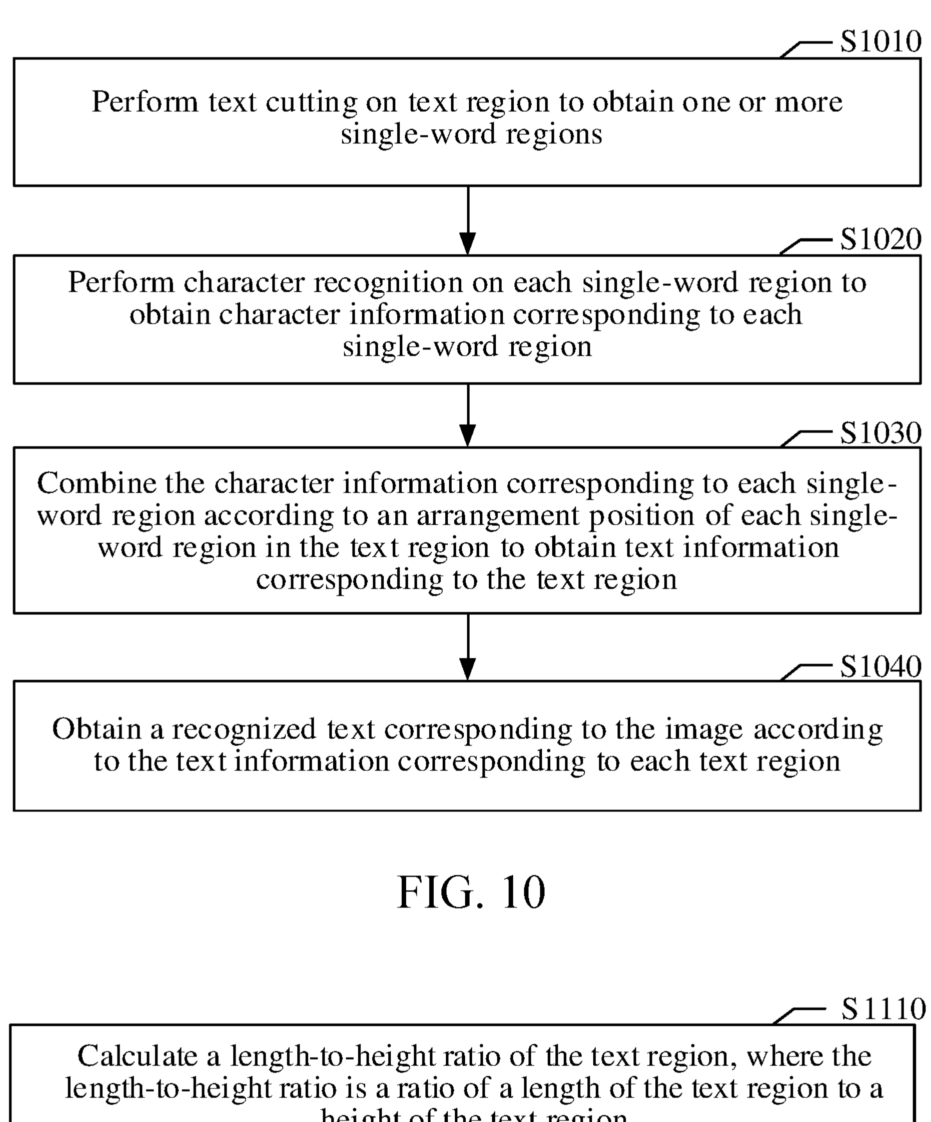

Calculate a length-to-height ratio of the text region, where the length-to-height ratio is a ratio of a length of the text region to a height of the text region

S1120

Calculate an estimated quantity of characters of the text region according to the length-to-height ratio

S1130

Perform uniform cutting on the text region in a length direction according to the estimated quantity to obtain the estimated quantity of single-word regions

FIG. 11

METHOD, COMPUTER-READABLE MEDIUM, AND ELECTRONIC DEVICE FOR IMAGE TEXT RECOGNITION

RELATED APPLICATIONS

This application is a continuation application of PCT Patent Application No. PCT/CN2022/118298, filed on Sep. 13, 2022, which claims priority to Chinese Patent Application No. 2021113071560, filed on Nov. 5, 2021, the entire content of all of which is incorporated herein by reference in their entirety.

FIELD OF THE TECHNOLOGY

The present disclosure relates to the field of computer technologies and specifically, to an image text recognition technology.

BACKGROUND OF THE DISCLOSURE

With the development of computer science and technology, the capability and level of automated processing of information have been significantly improved. Digitalization of picture documents, as one of the indispensable links in document digitalization, has attracted attentions.

When using an image text recognition method, features and rules need to be set manually according to scene changes of picture documents. This method is strongly affected by subjective factors and has poor generality, and often works well only for scenes with currently designed features and rules. Once the scenes for analysis change, features and rules previously designed may no longer apply, causing low text recognition accuracy.

SUMMARY

According to an aspect of embodiments of the present disclosure, an image text recognition method is provided, and is performed by an electronic device. The image text recognition method includes: converting an image for processing into a grayscale image, and segmenting, according to layer intervals to which grayscale values of pixels in the grayscale image belong, the grayscale image into grayscale layers with one corresponding to a layer interval, the layer interval being used for representing a grayscale value range of pixels in a corresponding grayscale layer; performing image erosion on a grayscale layer to obtain a feature layer corresponding to the grayscale layer, the feature layer including at least one connected region, and a connected region being a region formed by a plurality of connected pixels; overlaying feature layers to obtain an overlaid feature layer, the overlaid feature layer including connected regions; dilating connected regions on the overlaid feature layer according to a preset direction to obtain text regions; and performing text recognition on the text regions on the overlaid feature layer to obtain a recognized text corresponding to the image.

According to another aspect of embodiments of the present disclosure, an electronic device is provided. The electronic device includes a processor and a memory configured to store executable instructions of the processor. The processor is configured to perform an image text recognition method. The method includes: converting an image for processing into a grayscale image, and segmenting, according to layer intervals to which grayscale values of pixels in the grayscale image belong, the grayscale image into grayscale layers with one corresponding to a layer interval, the layer interval being used for representing a grayscale value range of pixels in a corresponding grayscale layer; performing image erosion on a grayscale layer to obtain a feature layer corresponding to the grayscale layer, the feature layer including at least one connected region, and a connected region being a region formed by a plurality of connected pixels; overlaying feature layers to obtain an overlaid feature layer, the overlaid feature layer including connected regions; dilating connected regions on the overlaid feature layer according to a preset direction to obtain text regions; and performing text recognition on the text regions on the overlaid feature layer to obtain a recognized text corresponding to the image.

According to another aspect of embodiments of the present disclosure, a non-transitory computer-readable medium is provided for storing a computer program. The computer program, when being executed, causes a processor to implement an image text recognition method. The method includes: converting an image for processing into a grayscale image, and segmenting, according to layer intervals to which grayscale values of pixels in the grayscale image belong, the grayscale image into grayscale layers with one corresponding to a layer interval, the layer interval being used for representing a grayscale value range of pixels in a corresponding grayscale layer; performing image erosion on a grayscale layer to obtain a feature layer corresponding to the grayscale layer, the feature layer including at least one connected region, and a connected region being a region formed by a plurality of connected pixels; overlaying feature layers to obtain an overlaid feature layer, the overlaid feature layer including connected regions; dilating connected regions on the overlaid feature layer according to a preset direction to obtain text regions; and performing text recognition on the text regions on the overlaid feature layer to obtain a recognized text corresponding to the image.

As disclosed, the grayscale image is segmented, according to layer intervals to which grayscale values of pixels in a grayscale image belong, into grayscale layers corresponding to each layer interval; image erosion is performed on each grayscale layer to obtain a feature layer corresponding to each grayscale layer; each feature layer is overlaid to obtain an overlaid feature layer; each connected region on the overlaid feature layer is dilated according to a preset direction to obtain each text region; and text recognition is performed on each text region on the overlaid feature layer to obtain a recognized text corresponding to the image for processing. In this way, by segmenting the grayscale image into grayscale layers corresponding to each layer interval and performing image erosion on each grayscale layer, the erosion treatment on each grayscale layer in the image is implemented, the erosion effect on each layer is improved, the missing recognition and false recognition of the connected region are avoided, the recognition accuracy of the connected region can be improved, and therefore the accurate recognition of the text of the image can be implemented.

BRIEF DESCRIPTION OF THE DRAWINGS

FIG. 10 is a flowchart illustrating performing text recognition on text regions on an overlaid feature layer according to an embodiment of the present disclosure.

FIG. 11 is a flowchart illustrating performing text cutting on text region according to an embodiment of the present disclosure.

DESCRIPTION OF EMBODIMENTS

The solutions provided in the embodiments of the present disclosure involve technologies such as computer vision and machine learning of artificial intelligence, and are specifically described by using the following embodiments.

Figure 1:
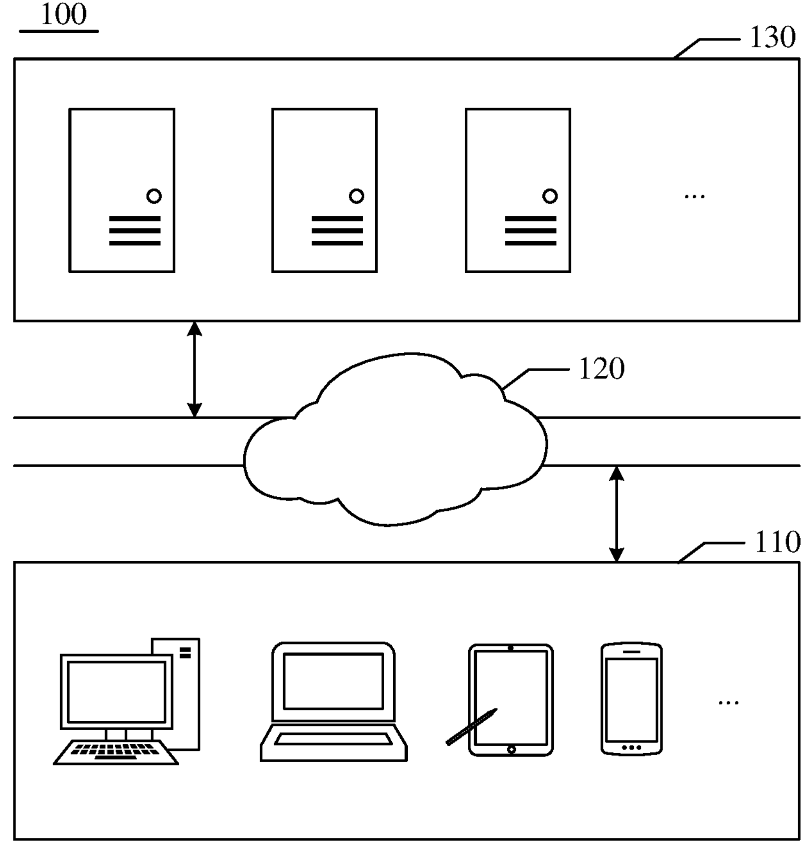
FIG. 1 is a block diagram of an exemplary system architecture to which technical solutions of the present disclosure are applied.

FIG. 1 schematically shows a block diagram of an exemplary system architecture to which various technical solutions of the present disclosure are applied.

As shown in FIG. 1, the system architecture 100 may include a terminal device 110, a network 120, and a server 130. The terminal device 110 may include various electronic devices such as a smartphone, a tablet computer, a notebook computer, a desktop computer, a smart speaker, a smartwatch, a smart voice interaction device, a smart household appliance, and a vehicle terminal. The server 130 may be an independent physical server, or may be a server cluster including a plurality of physical servers or a distributed system, or may be a cloud server providing cloud computing services. The network 120 may be a communication medium providing various connection types of communication links between the terminal device 110 and the server 130. For example, the network 120 may be a wired communication link or a wireless communication link.

The system architecture in an embodiment of the present disclosure may include any quantity of terminal devices, networks, and servers according to an implementation requirement. For example, the server 130 may be a server cluster including a plurality of servers. In addition, the technical solutions provided in the embodiments of the present disclosure may be applied to the terminal device 110 or the server 130, or may be cooperatively implemented by the terminal device 110 and the server 130, which is not specifically limited in the present disclosure.

For example, the server 130 may be configured to perform an image text recognition method according to the embodiments of the present disclosure, and a user interacts with the server 130 through a client on the terminal device 110. In this way, a grayscale image is segmented, according to layer intervals to which grayscale values of pixels in a grayscale image belong, into grayscale layers corresponding to each layer interval; image erosion is performed on each grayscale layer to obtain a feature layer corresponding to each grayscale layer; each feature layer is overlaid to obtain an overlaid feature layer; each connected region on the overlaid feature layer is dilated according to a preset direction to obtain each text region; and text recognition is performed on each text region on the overlaid feature layer to obtain a recognized text corresponding to the image. In this way, by segmenting the grayscale image into grayscale layers corresponding to each layer interval and performing image erosion on each grayscale layer, the erosion treatment on each grayscale layer in the image is implemented, the erosion effect on each layer is improved, the missing recognition and false recognition of the connected region are avoided, the recognition accuracy of the connected region can be improved, and therefore the accurate recognition of the text of the image can be implemented.

Alternatively, for example, the server 130 may be configured to perform the image text recognition method according to the embodiments of the present disclosure to implement an automated processing of a complaint sheet. That is, the user uploads the complaint sheet to the server 130 through the client on the terminal device 110, and the server 130 performs text recognition on the complaint sheet through the image text recognition method according to the embodiments of the present disclosure, and then inputs a recognized text corresponding to each text region into a pre-trained neural network model to obtain a complaint effectiveness label and a complaint risk label corresponding to the complaint sheet, and stores the complaint effectiveness label and the complaint risk label corresponding to the complaint sheet and a subject corresponding to the complaint sheet into a complaint sheet database, thereby implementing the automated processing of the complaint sheet, which can save labor and improve the processing efficiency of the complaint sheet.

In the related art, a text of an image is usually extracted by edge detection. However, edge detection on an image with complex background may cause edge information of the text to be easily ignored because of the excessive edge of the background (that is, noise increase), which leads to a poor text recognition effect. If erosion or dilation is performed at this time, the background region is bonded with the text region, and the effect is further worse. However, in some scenarios, for example, the picture in the complaint sheet may be a chat screenshot, product page screenshots, or the like, the page background is complex, and the capability of recognizing the text in the image is poor.

In the implementations of the present disclosure, by segmenting the grayscale image into grayscale layers corresponding to each layer interval and performing image erosion on each grayscale layer, the erosion treatment on each grayscale layer in the image is implemented, the erosion effect on each layer is improved, the missing recognition and false recognition of the connected region are avoided, the recognition accuracy of the connected region can be improved, and therefore the accurate recognition of the text of the image can be implemented.

The following describes the image text recognition method according to the present disclosure in detail with reference to specific implementations.

Figure 2:
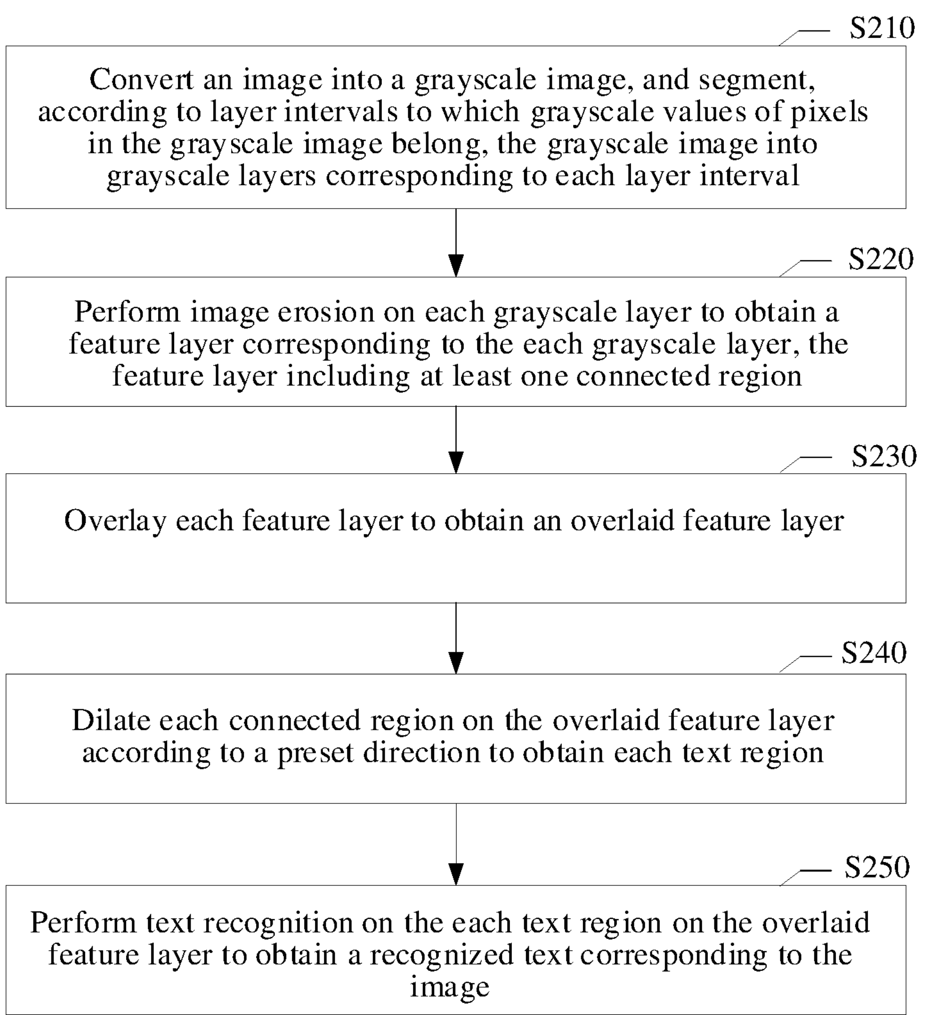
FIG. 2 is a flowchart illustrating an image text recognition method according to an embodiment of the present disclosure.

FIG. 2 schematically shows a flowchart of steps of an image text recognition method according to an embodiment of the present disclosure. An execution body of the image text recognition method may be an electronic device, which may be specifically a terminal device, a server, or the like, which is not limited in the present disclosure. As shown in FIG. 2, the image text recognition method may mainly include the following step S210 to step S250.

S210. Convert an image (e.g., an image) into a grayscale image, and segment, according to layer intervals to which grayscale values of pixels in the grayscale image belong, the grayscale image into grayscale layers corresponding to each layer interval, the layer interval being used for representing a grayscale value range of pixels in the corresponding grayscale layers.

Specifically, the image may be a screenshot of a chat record picture, a transaction order interface, a document, an advertisement, or the like. The grayscale value range of each layer interval may be a preset range in which any two grayscale values do not overlap.

In this way, a grayscale image can be segmented into grayscale layers corresponding to each layer interval, and pixels with close grayscale values can be grouped into the same layer, so that image erosion and recognition of the connected region are performed for each layer in subsequent steps, the erosion effect for each layer can be improved, and the missing recognition and false recognition of the connected region can be avoided.

Figure 3:
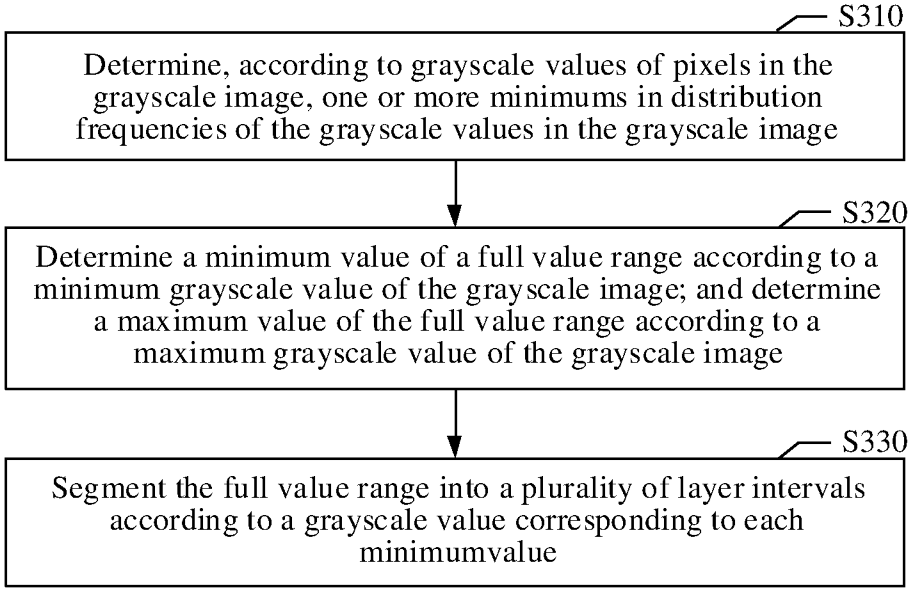
FIG. 3 is a flowchart of exemplary steps before segmenting a grayscale image into grayscale layers according to an embodiment of the present disclosure.

FIG. 3 schematically shows a flowchart of steps before segmenting a grayscale image into grayscale layers corresponding to each layer interval according to an embodiment of the present disclosure. As shown in FIG. 3, based on the foregoing embodiments, before segmenting, according to layer intervals to which grayscale values of pixels in the grayscale image belong, the grayscale image into grayscale layers corresponding to each layer interval in step S210, the method may further include the following step S310 to step S330.

S310. Determine, according to grayscale values of pixels in the grayscale image, one or more minimums in distribution frequencies of the grayscale values in the grayscale image.

S320. Determine a minimum value of a full value range according to a minimum grayscale value of the grayscale image; and determine a maximum value of the full value range according to a maximum grayscale value of the grayscale image.

S330. Segment the full value range into a plurality of layer intervals according to a grayscale value corresponding to each minimum.

Figure 4:
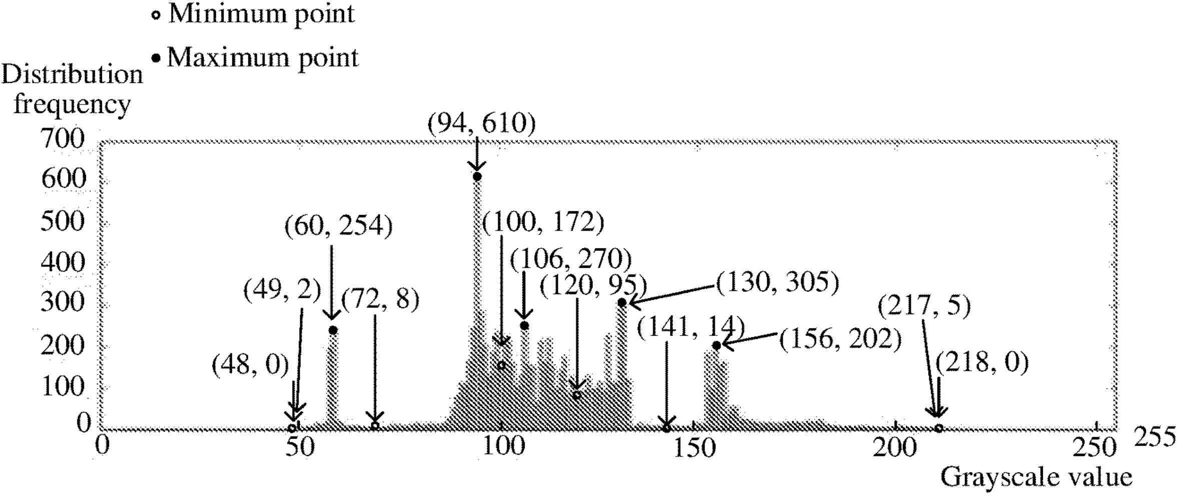
FIG. 4 is a schematic diagram of a correspondence between grayscale values and distribution frequencies of grayscale image according to an embodiment of the present disclosure.

FIG. 4 schematically shows a schematic diagram of a correspondence between grayscale values and distribution frequencies of a grayscale image according to an embodiment of the present disclosure. For example, referring to FIG. 4, according to the schematic diagram of the correspondence between the grayscale values and the distribution frequencies of the grayscale image, minimums corresponding to six minimum points in the distribution frequencies of the grayscale values in the grayscale image: a minimum 0 corresponding to a minimum point (48, 0), a minimum 8 corresponding to a minimum point (72, 8), a minimum 172 corresponding to a minimum point (100, 172), a minimum 95 corresponding to a minimum point (120, 95), a minimum 14 corresponding to a minimum point (141, 14), and a minimum 0 corresponding to a minimum point (218, 0), may be determined. Then, according to a minimum grayscale value 49 of the grayscale image, the minimum value of the full value range is determined as a grayscale value 49, or any grayscale value less than the minimum grayscale value 49, such as the grayscale value 0, 1, 5, or the like, may be used as the minimum value of the full value range. According to the maximum grayscale value 217 of the grayscale image, the maximum value of the full value range is determined as a grayscale value 217, or any grayscale value greater than the maximum grayscale value 217, such as the grayscale value of 250, 254, 255, or the like, may be used as the maximum value of the full value range.

For example, according to the minimum grayscale value 49 of the grayscale image, the minimum value of the full value range is determined as a grayscale value 49, and according to the maximum grayscale value 217 of the grayscale image, the maximum value of the full value range is determined as a grayscale value 217. Then the full value range is segmented into a plurality of layer intervals [49, 72], (72, 100], (100, 120], (120, 141], and (141, 217] according to the grayscale values corresponding to the minimums.

In another example, according to the minimum grayscale value 49 of the grayscale image, the minimum value of the full value range is determined as a grayscale value 0 less than the grayscale value 49, and according to the maximum grayscale value 217 of the grayscale image, the maximum value of the full value range is determined as a grayscale value 225 greater than the grayscale value 217. Then, after a minimum grayscale value 48 and a maximum grayscale value 218 in the grayscale values corresponding to the minimums are removed, the full value range is segmented into a plurality of layer intervals [0, 72], (72, 100], (100, 120], (120, 141], and (141, 255] according to the grayscale values corresponding to the minimums.

In some implementations, a correspondence between the grayscale values of the grayscale image and occurrence probabilities of the grayscale values may be generated according to the grayscale values of the pixels in the grayscale image, then one or more minimums of the occurrence probabilities of the grayscale values in the grayscale image may be determined, and then the full value range may be segmented into a plurality of layer intervals according to the grayscale value corresponding to each minimum. The specific solution is similar to step S310 to step S330, and is not described herein again.

In this way, the full value range is segmented into a plurality of layer intervals, which is beneficial to subsequently segmenting the grayscale image into grayscale layers corresponding to each layer interval according to the plurality of layer intervals, thereby facilitating erosion on each layer, and the grayscale value of each layer is approximate, which can be beneficial to improving the erosion effect on the image.

In some implementations, before the full value range is segmented into a plurality of layer intervals according to the grayscale value corresponding to each minimum in step S330, one or more maximums in the distribution frequencies of the grayscale values in the grayscale image may be determined first according to the grayscale values of the pixels in the grayscale image, and then a quantity of layer intervals obtained through segmentation based on the full value range may be determined according to a quantity of maximums, where the value range of each layer interval includes a corresponding maximum. Specifically, referring to FIG. 4, before the full value range is segmented into a plurality of layer intervals according to the grayscale value corresponding to each minimum in step S330, one or more maximums in the distribution frequencies of the grayscale values in the grayscale image: a maximum 254 corresponding to a maximum point (60, 254), a maximum 610 corresponding to a maximum point (94, 610), a maximum 270 corresponding to a maximum point (106, 270), a maximum 305 corresponding to a maximum point (130, 305), and a maximum 202 corresponding to a maximum point (156, 202), may be determined first according to the grayscale values of the pixels in the grayscale image. Then the quantity of layer intervals obtained through segmentation based on the full value range is also determined to 5 according to the quantity 5 of maximums. The value range of each layer interval includes a corresponding maximum. Then as described in the above embodiments, the full value range is segmented into 5 layer intervals [49, 72], (72, 100], (100, 120], (120, 141], and (141,217] according to the grayscale value corresponding to each minimum.

Figure 5:
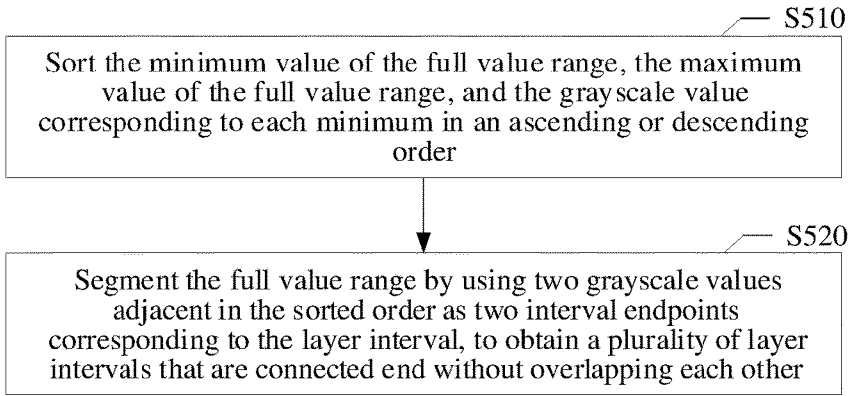
FIG. 5 is a flowchart illustrating segmenting a full value range into layer intervals according to an embodiment of the present disclosure.

FIG. 5 schematically shows a flowchart of steps before segmenting a full value range into a plurality of layer intervals according to an embodiment of the present disclosure. As shown in FIG. 5, based on the foregoing embodiments, the segmenting the full value range into a plurality of layer intervals according to a grayscale value corresponding to each minimum in step S330 may further include the following step S510 to step S520.

S510. Sort the minimum value of the full value range, the maximum value of the full value range, and the grayscale value corresponding to each minimum in an ascending or descending order.

S520. Segment the full value range by using two grayscale values adjacent in order as two interval endpoints corresponding to the layer interval, to obtain a plurality of layer intervals that are connected end to end and do not overlap.

For example, as the embodiment in FIG. 4, the grayscale value 0 less than the minimum grayscale value 49 is used as the minimum value of the full value range, and the grayscale value 255 greater than the maximum grayscale value 217 is used as the maximum value of the full value range. Then, the minimum value 0 of the full value range, the maximum value 255 of the full value range, and the grayscale values obtained after the minimum grayscale value 48 and the maximum grayscale value 218 in the grayscale values 48, 72, 100, 120, 141 and 218 corresponding to the minimums are removed are sorted in an ascending order to obtain: 0, 72, 100, 120, 141, and 255. Then, the full value range is segmented by using two grayscale values adjacent in order as two interval endpoints corresponding to the layer interval, to obtain a plurality of layer intervals [0, 72], (72, 100], (100, 120], (120, 141], and (141, 255] that are connected end to end and do not overlap.

Figure 6:
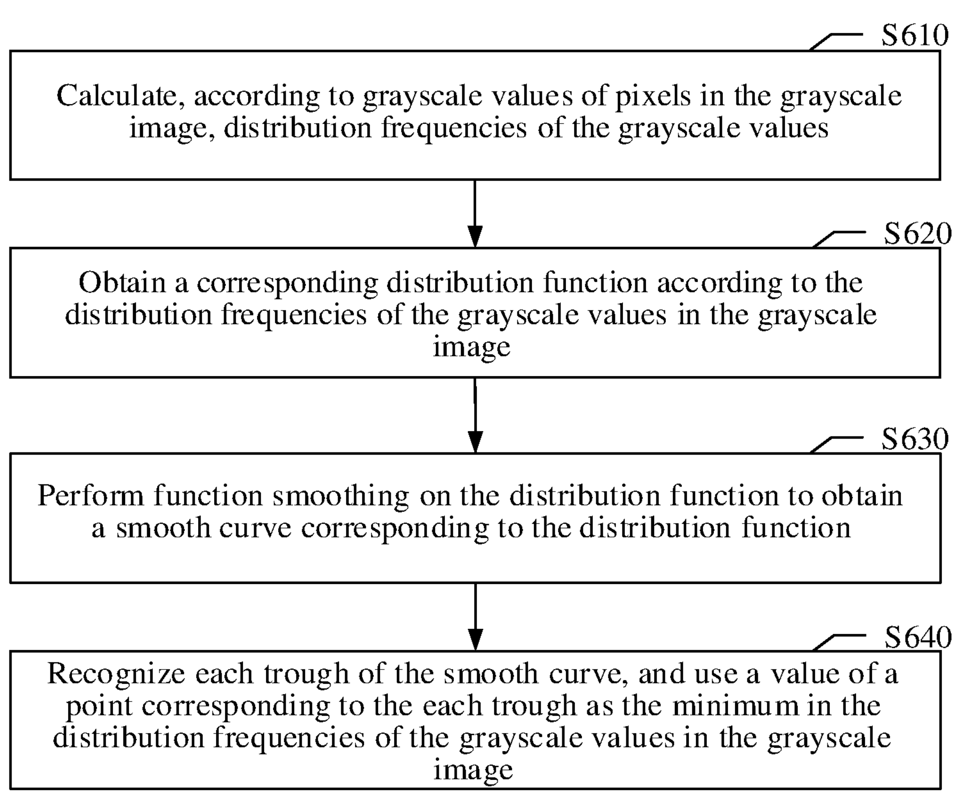
FIG. 6 is a flowchart illustrating determining one or more minimums in distribution frequencies of grayscale values in a grayscale image according to an embodiment of the present disclosure.

FIG. 6 schematically shows a flowchart of steps of determining one or more minimums in distribution frequencies of grayscale values in the grayscale image according to an embodiment of the present disclosure. As shown in FIG. 6, based on the foregoing embodiments, the determining, according to grayscale values of pixels in the grayscale image, one or more minimums in distribution frequencies of the grayscale values in step 310 may further include the following step S610 to step S640.

S610. Calculate, according to grayscale values of pixels in the grayscale image, distribution frequencies of the grayscale values.

S620. Obtain a corresponding distribution function according to the distribution frequencies of the grayscale values in the grayscale image.

S630. Perform function smoothing on the distribution function to obtain a smooth curve corresponding to the distribution function.

S640. Recognize each trough of the smooth curve, and use a value of a point corresponding to each trough as the minimum in the distribution frequencies of the grayscale values in the grayscale image.

Specifically, function smoothing on the distribution function may be kernel density estimation on the distribution function, which makes the distribution of the distribution function smooth and continuous, thereby obtaining a clear trough, which is beneficial to obtaining a more accurate minimum from the statistical point of view, and then grouping a layer interval according to a clustering trend of the grayscale values of the grayscale images, which makes the grouping of the layer interval more accurate to group similar pixels with close grayscale values into the same layer, and is beneficial to improving the recognition accuracy of the connected region, and further improving the recognition accuracy of the text of the image.

In some implementations, in addition to using kernel density estimation to perform function smoothing on the distribution function, filtering or the like may also be used to perform function smoothing on the distribution function, which is not limited in the present disclosure.

In some implementations, after step S630, each peak of the smooth curve may be recognized, a value of a point corresponding to each peak may be used as a maximum in the distribution frequencies of the grayscale values in the grayscale image, and then a quantity of layer intervals obtained through segmentation based on the full value range may be determined according to a quantity of maximums, where the value range of each layer interval includes a corresponding maximum.

S220. Perform image erosion on each grayscale layer to obtain a feature layer corresponding to each grayscale layer, the feature layer including at least one connected region, and the connected region being a region formed by a plurality of connected pixels.

Specifically, the image erosion may be scanning and eroding the pixels one by one by using convolution kernels, which is not limited in the present disclosure.

The connected region is a region formed by a plurality of connected pixels. In a region with connected pixels, each pixel has an adjacent relationship with at least one of the pixels in the region. The adjacent relationship may include 4 adjacency, 8 adjacency, or the like.

Figure 7:
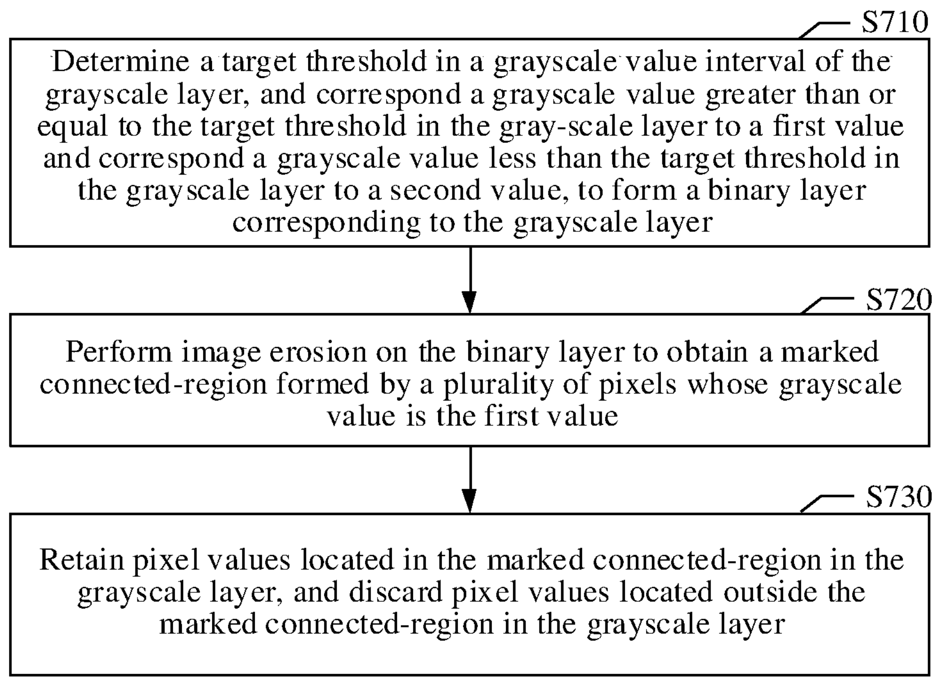
FIG. 7 is a flowchart illustrating performing image erosion on a grayscale layer according to an embodiment of the present disclosure.

FIG. 7 schematically shows a flowchart of steps of performing image erosion on each grayscale layer according to an embodiment of the present disclosure. As shown in FIG. 7, based on the foregoing embodiments, the performing image erosion on each grayscale layer to obtain a feature layer corresponding to each grayscale layer in step S220 may further include the following step S710 to step S730.

- S710. Determine a target threshold in a grayscale value interval of the grayscale layer, and correspond a grayscale value greater than or equal to the target threshold in the grayscale layer to a first value and correspond a grayscale value less than the target threshold in the grayscale layer to a second value, to form a binary layer corresponding to the grayscale layer.
- S720. Perform image erosion on the binary layer to obtain a marked connected-region formed by a plurality of pixels whose grayscale value is the first value.
- S730. Retain pixel values located in the marked connected-region in the grayscale layer, and discard pixel values located outside the marked connected-region in the grayscale layer.

Therefore, after the binary layer corresponding to the grayscale layer is determined, image erosion is performed on the binary layer to obtain a marked connected-region formed by a plurality of pixels whose grayscale value is a first value, then pixel values located in the marked connected-region corresponding to the binary layer in the grayscale layer are retained, and pixel values located outside the marked connected-region corresponding to the binary layer in the grayscale layer are discarded, so that the erosion on the grayscale layer is implemented without losing multi-level grayscale values of the pixels of the grayscale layer, that is, the recognition of the connected region in the layer is implemented when the color level accuracy of the image layer is retained.

- S230. Overlay each feature layer to obtain an overlaid feature layer, the overlaid feature layer including a plurality of connected regions.

Figure 8:
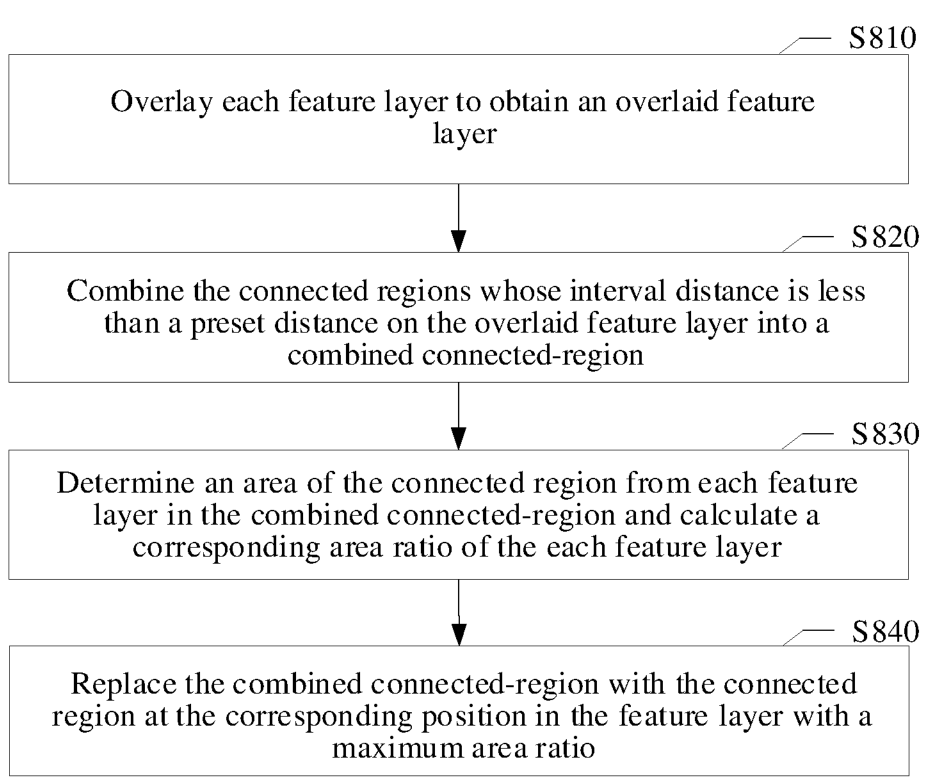
FIG. 8 is a flowchart illustrating overlaying feature layers according to an embodiment of the present disclosure.

FIG. 8 schematically shows a flowchart of steps of overlaying each feature layer according to an embodiment of the present disclosure. As shown in FIG. 8, based on the foregoing embodiments, the overlaying each feature layer to obtain an overlaid feature layer in step S230 may further include the following step S810 to step S840.

- S810. Overlay each feature layer to obtain an overlaid feature layer.
- S820. Combine the connected regions whose interval distance is less than a preset distance on the overlaid feature layer into a combined connected-region;
- S830. Determine an area of the connected region from each feature layer in the combined connected-region and calculate a corresponding area ratio of each feature layer, where the area ratio is a ratio of an area of the connected region at the corresponding position in the feature layer to an area of the combined connected-region.
- S840. Replace the combined connected-region with the connected region at the corresponding position in the feature layer with a maximum area ratio.

In this way, each feature layer is overlaid to obtain an overlaid feature layer, and the connected regions whose interval distance is less than a preset distance on the overlaid feature layer are combined into a combined connected-region, so that the connected regions originally spliced or close between each layer can be combined to be associated, thereby enhancing the association between each layer and improving the recognition accuracy of layers to be processed. Then, the combined connected-region is replaced with the connected region at the corresponding position in the feature layer with a maximum area ratio, that is, only the connected region at the corresponding position in the feature layer with the maximum area ratio in the combined connected-region is retained. In other words, only the connected region at the corresponding position in the feature layer with a larger contribution is retained, so that the subsequent recognition of the combined connected-region can more focus on the feature layer with the larger contribution, thereby improving the recognition accuracy of the connected region and the recognition accuracy of the text of the image.

- S240. Dilate each connected region on the overlaid feature layer according to a preset direction to obtain each text region.

Specifically, the preset direction is a horizontal direction, a vertical direction, an oblique 30° direction, an oblique 45° direction, an oblique 60° direction, a curve direction with a curvature, or the like, and different preset directions may be used depending on application scenarios.

Figure 9:
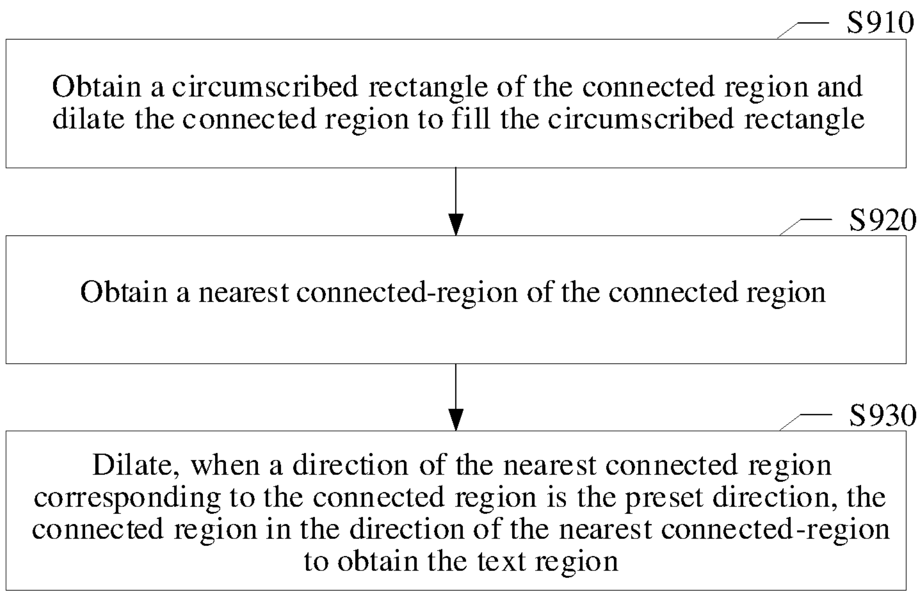
FIG. 9 is a flowchart illustrating dilating connected regions on an overlaid feature layer according to an embodiment of the present disclosure.

FIG. 9 schematically shows a flowchart of steps of dilating each connected region on an overlaid feature layer according to a preset direction according to an embodiment of the present disclosure. As shown in FIG. 9, based on the foregoing embodiments, the preset direction is a horizontal direction or a vertical direction, and the dilating each connected region on the overlaid feature layer according to a preset direction to obtain each text region in step S240 may further include the following step S910 to step S930.

- S910. Obtain a circumscribed rectangle of the connected region and dilate the connected region to fill the circumscribed rectangle, where the circumscribed rectangle is a rectangle circumscribed with the connected region in the preset direction.
- S920. Obtain a nearest connected-region of the connected region, where the nearest connected-region is a connected region with a shortest interval distance from the connected region.
- S930. Dilate, when a direction of the nearest connected-region corresponding to the connected region is the preset direction, the connected region in the direction of the nearest connected-region to obtain the text region.

In this way, the dilation in the preset direction between the connected region and the nearest connected-region can be implemented to obtain the text region. It can be understood that, Chinese characters such as "小", "旦", "八", and "元" are not completely connected inside, but are separated from the incomplete parts of the characters, and therefore are not recognized as a connected region in the layer, but as a plurality of connected regions. However, in the present disclosure, the dilation in the preset direction between the connected region and the nearest connected-region is implemented to obtain the text region, so that a connected region containing incomplete characters or single characters can be connected into a text region through dilation, where the text region may include a plurality of characters. However, in the dilation process, the incomplete characters are also wrapped in the dilation region, which can avoid missing recognition of characters or separate recognition of incomplete characters, and further improve the text recognition capability of the image.

In some implementations, when the direction of the nearest connected-region relative to the connected region is a preset direction, the connected region is dilated to the direction of the nearest connected-region, where the preset direction is a horizontal direction. In this way, in combination with reading habits of people, texts of most images are horizontally typeset, so that the text recognition accuracy of most images can be improved.

In some implementations, when the direction of the nearest connected-region relative to the connected region is a preset direction, the connected region is triggered to dilate together in a direction opposite to the nearest connected-region to obtain a text region. In this way, the connected region and the nearest connected-region can be dilated together in opposite directions, so that the dilation is more uniform and a more accurate text region can be obtained.

In some implementations, when the direction of the nearest connected-region relative to the connected region is a preset direction, and the interval distance between the nearest connected-region and the connected region is less than a first preset distance, the connected region is dilated in the direction of the nearest connected-region to obtain the text region. In this way, when the interval distance between the nearest connected-region and the connected region is excessive, the dilation between the nearest connected-region and the connected region still occurs, thereby avoiding the dilation and connection of irrelevant connected regions to obtain a text region, and improving the recognition accuracy of the text region.

S250. Perform text recognition on each text region on the overlaid feature layer to obtain a recognized text corresponding to the image.

Specifically, each text region on the overlaid feature layer may be inputted into a pre-trained machine learning model to obtain the recognition text corresponding to the image. The pre-trained machine learning model may be established based on a CNN (Convolutional Neural Network) model, a CNN+LSTM (Long Short-Term Memory) model, a Faster RCNN, or the like. Training data may be constructed first, and a 48×48 grayscale image of may be used to construct a sample image, where each sample image may include a single character as training data for training a machine learning model. In order to ensure the adequacy of the training data, 45 different types of fonts, such as SimSun, SimHei, KaiTi, and irregular handwriting fonts, may be collected, to cover all kinds of printed fonts comprehensively, thereby improving the recognition capability of the machine learning model for characters.

In some implementations, various different types of fonts may include a plurality of pictures of different font sizes, where each font size includes a plurality of pictures, thereby improving the diversity of the training data and the comprehensiveness of coverage.

In some implementations, each sample image may be added with random artificial noise of a preset ratio of 5%, 6%, 7%, 8%, 9%, or 10%, thereby enhancing the generalization capability of the machine learning model.

FIG. 10 schematically shows a flowchart of steps of performing text recognition on each text region on the overlaid feature layer according to an embodiment of the present disclosure. As shown in FIG. 10, based on the foregoing embodiments, the performing text recognition on each text region on the overlaid feature layer to obtain a recognized text corresponding to the image in step S250 may further include the following step S1010 to step S1040.

S1010. Perform text cutting on the text region to obtain one or more single-word regions.

S1020. Perform character recognition on each single-word region to obtain character information corresponding to each single-word region.

S1030. Combine the character information corresponding to each single-word region according to an arrangement position of each single-word region in the text region to obtain text information corresponding to the text region.

S1040. Obtain a recognized text corresponding to the image according to the text information corresponding to each text region.

Specifically, the obtaining a recognized text of the image according to the text information corresponding to each text region may be obtaining the recognized text of the image according to a position of each text region in the image. For example, the text regions in similar positions and distributed line by line may be spliced line by line to obtain the recognized text of the image.

In this way, after text cutting is performed on the text region to obtain single-word regions, character recognition is performed on each single-word region, and recognized objects are all single-word regions. Compared with directly recognizing the entire text region, the recognition method can be simplified and the recognition accuracy can be improved. For example, compared with the construction and training for recognition of the entire text region, it is easier to construct and train the recognition model for recognition of the single-word, and a better training effect can be achieved through a small amount of training data.

FIG. 11 schematically shows a flowchart of steps of performing text cutting on the text region according to an embodiment of the present disclosure. As shown in FIG. 11, based on the foregoing embodiments, the performing text cutting on the text region to obtain one or more single-word regions in step S1010 may further include the following step S1110 to step S1130.

S1110. Calculate a length-to-height ratio of the text region, where the length-to-height ratio is a ratio of a length of the text region to a height of the text region.

S1120. Calculate an estimated quantity of characters of the text region according to the length-to-height ratio.

S1130. Perform uniform cutting on the text region in a length direction according to the estimated quantity to obtain the estimated quantity of single-word regions.

It can be understood that for each character of the same language, there is generally a fixed length-height ratio. Therefore, according to the length-height ratio of the text region, the quantity of characters included in the text region may be approximately estimated, which facilitates accurate cutting of the text region to implement accurate recognition of the single-word region.

Figure 12:
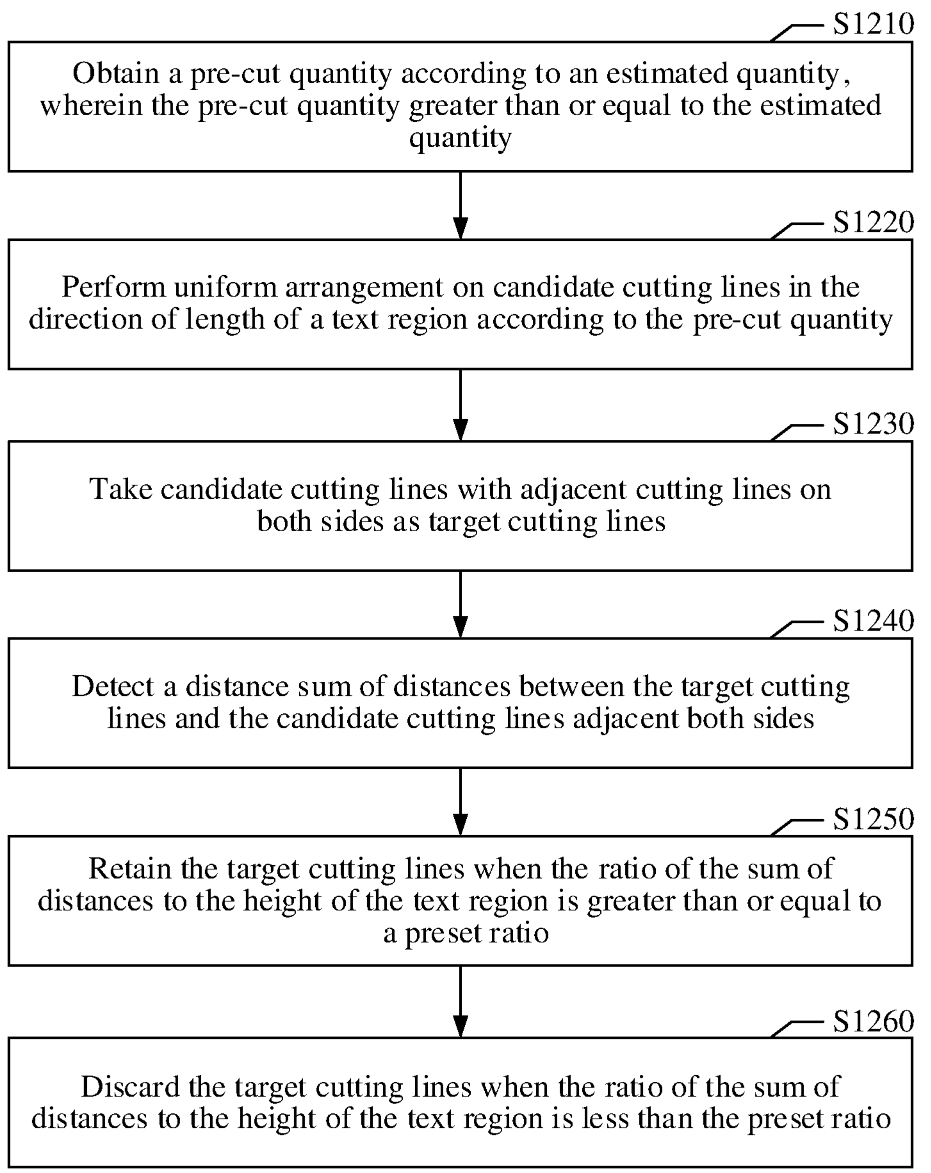
FIG. 12 is a flowchart illustrating performing uniform cutting on text region in a length direction according to an estimated quantity according to an embodiment of the present disclosure.

FIG. 12 schematically shows a flowchart of steps of performing uniform cutting on the text region in a length direction according to an estimated quantity according to an embodiment of the present disclosure. As shown in FIG. 12, based on the foregoing embodiments, the performing uniform cutting on the text region in a length direction of according to the estimated quantity to obtain the estimated quantity of single-word regions in step S1130 may further include the following step S1210 to step S1260.

S1210. Obtain a pre-cut quantity according to the estimated quantity, where the pre-cut quantity is greater than or equal to the estimated quantity.

S1220. Perform uniform arrangement on candidate cutting lines in the length direction of the text region according to the pre-cut quantity, where the candidate cutting lines are used for performing uniform cutting on the text region in the length direction to obtain a candidate region with the pre-cut quantity.

S1230. Use a candidate cutting line with adjacent cutting lines on both sides as a target cutting line.

S1240. Detect a distance sum of distances between the target cutting line and the adjacent candidate cutting lines on both sides.

S1250. Retain the target cutting line when a ratio of the distance sum to the height of the text region is greater than or equal to a preset ratio.

S1260. Discard the target cutting lines when the ratio of the distance sum to the height of the text region is less than the preset ratio.

Since the interval between two characters generally has a minimum interval, performing the method of steps S1210 to S1260 by using an empirical value of a ratio between the minimum interval between two characters and a height of a text line formed by characters as a preset ratio can implement screening of candidate cutting lines, thereby improving the cutting accuracy of the single-word region and further improving the accuracy of character recognition.

Figure 13:
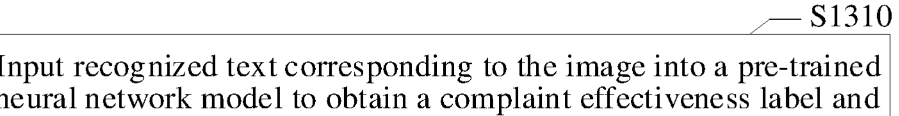
FIG. 13 is a flowchart of exemplary steps after obtaining a recognized image corresponding to an image according to an embodiment of the present disclosure.

FIG. 13 schematically shows a flowchart of steps after obtaining a recognized image corresponding to an image according to an embodiment of the present disclosure. As shown in FIG. 13, based on the foregoing embodiments, the method is applied to automated processing of a complaint sheet and the image includes an image in the complaint sheet. After the performing text recognition on each text region on the overlaid feature layer to obtain a recognized text corresponding to the image in step S250, the method further includes the following step S1310 to step S1320.

S1310. Input the recognized text corresponding to the image into a pre-trained neural network model to obtain a complaint effectiveness label and a complaint risk label corresponding to a complaint sheet to which the image belongs.

S1320. Store the complaint effectiveness label and the complaint risk label corresponding to the complaint sheet and a subject corresponding to the complaint sheet into a complaint sheet database.

The complaint effectiveness label may include a complaint effective label and a complaint ineffective label. The complaint risk label may include an empty classification label, a dating fraud risk label, a gambling risk label, a pornography risk label, a transaction dispute risk label, and the like.

The neural network model may include a first sub-neural network model and a second sub-neural network model. The first sub-neural network model may be a pre-trained model such as BERT (Bidirectional Encoder Representation from Transformers), which can perform semantic understanding and text classification on the recognized text corresponding to the image, to obtain the complaint effectiveness label corresponding to the recognized text. The second sub-neural network model may be a classification model such as CRF (Conditional Random Fields), which can perform semantic understanding, information extraction, and text classification on the recognized text corresponding to the image, to obtain the complaint risk label corresponding to the recognized text.

In some implementations, data cleaning and denoising may be performed first on the recognized text corresponding to the image, and then the recognized text is inputted into the pre-trained neural network model. Specifically, the data cleaning may include removing illegal characters, stop words, emoticons, and the like in the recognized text corresponding to the image, and then typo correction and symbol cleaning are performed on the text.

In some implementations, the pre-trained neural network model may be deployed on a quasi-real-time platform to output a complaint effectiveness label and a complaint risk label corresponding to a complaint sheet at an hourly level, and store the complaint effectiveness label and the complaint risk label corresponding to the complaint sheet and a subject corresponding to the complaint sheet may be stored into a complaint sheet database.

Figure 14:
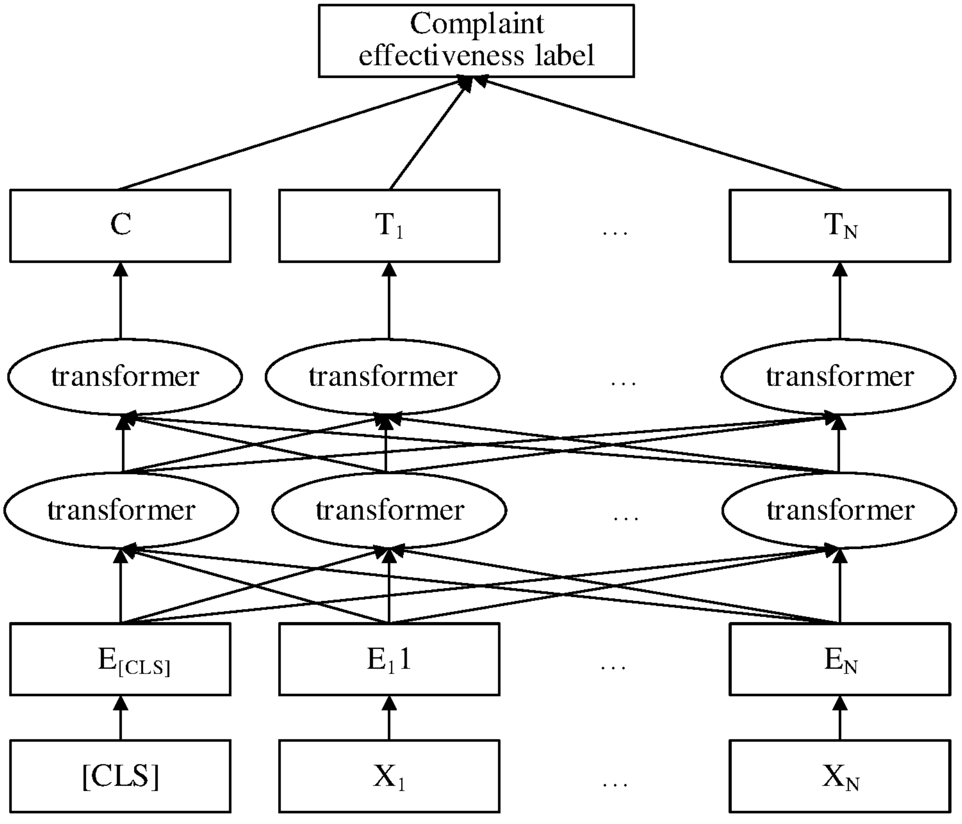
FIG. 14 is a schematic diagram of an internal structure of a first sub-neural network model according to an embodiment of the present disclosure.

FIG. 14 schematically shows a schematic diagram of an internal structure of a first sub-neural network model according to an embodiment of the present disclosure. Specifically, after word segmentation is performed on the recognized text corresponding to the image, the recognized text is inputted into the first sub-neural network model. For example, if the recognized text corresponding to the image is: "Hello, I am Zhang San.", after word segmentation is performed on the recognized text "Hello, I am Zhang San." corresponding to the image, "[CLS]/Hello/,/I/am/Zhang San/.[SEP]" is obtained. Then make X1="Hello", X2=",", X3="I", X4="am", X5="Zhang San", X6=".", XN="[SEP]", which are inputted into the first sub-neural network model shown in FIG. 14. A code E[CLS] of X[CLS] is obtained by embedding a code in X[CLS], a code E1 of X1 is obtained by embedding a code in X1, . . . , a code EN of XN is obtained by embedding a code in XN, and so on. Then, E[CLS], E1 . . . , and EN are inputted into a transformer neural network to obtain the corresponding text features C, T1 . . . , and TN, and then a complaint effectiveness label of the recognized text "Hello, I am Zhang San." corresponding to the image is obtained according to the text features C, T1 . . . , and TN.

Figure 15:
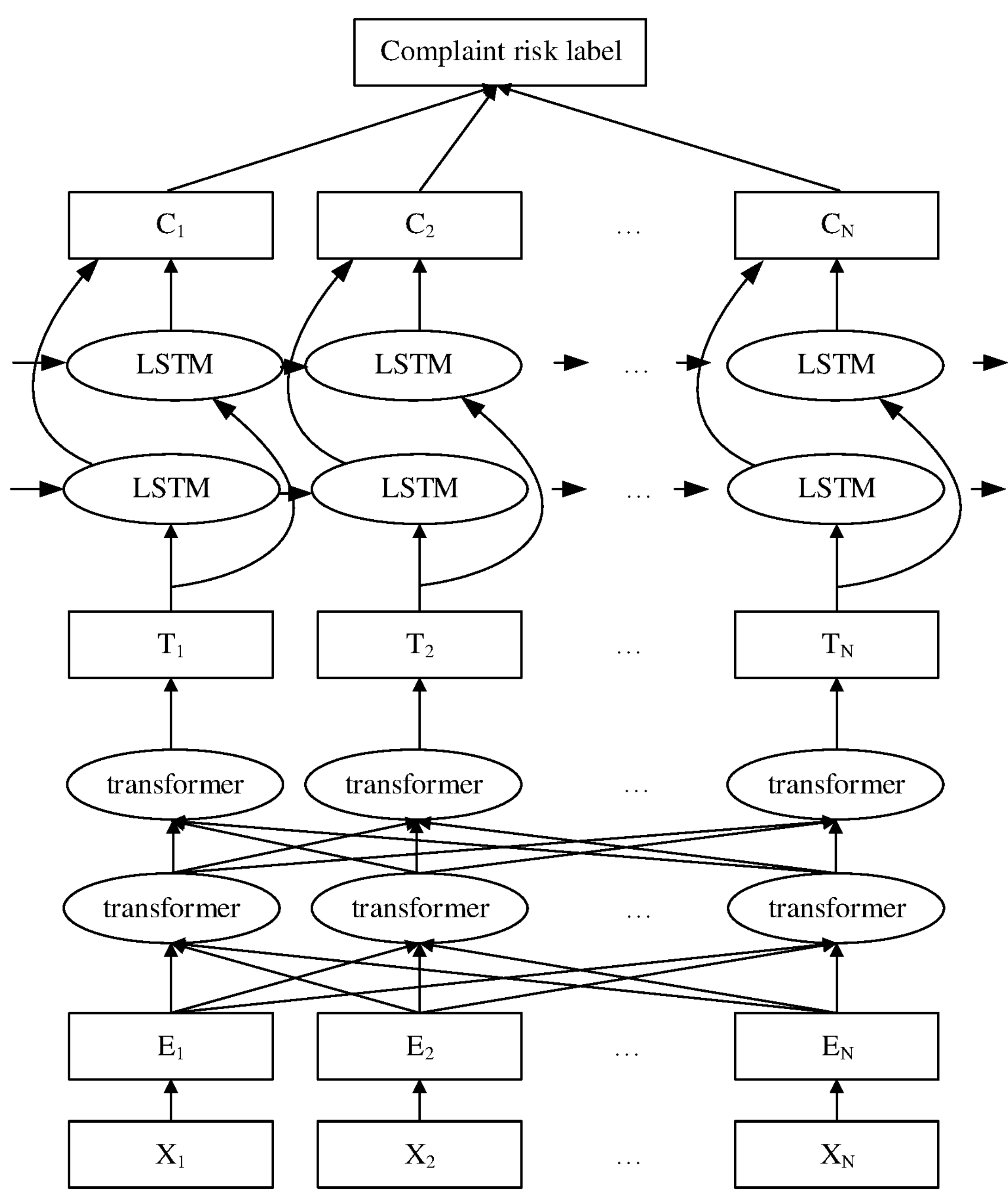
FIG. 15 is a schematic diagram of an internal structure of a second sub-neural network model according to an embodiment of the present disclosure.

FIG. 15 schematically shows a schematic diagram of an internal structure of a second sub-neural network model according to an embodiment of the present disclosure. For example, if the recognized text corresponding to the image is: "I come from City A.", after word segmentation is performed on the recognized text "I come from City A." corresponding to the image, "I/come from/City A/." is obtained. Then make X1="I", X2="come from", X3="City A", X4=".", which are inputted into the second sub-neural network model shown in FIG. 15. A code E1 of X1 is obtained by embedding a code in X1, a code E2 of X2 is obtained by embedding a code in X2 . . . , a code EN of XN is obtained by embedding a code in XN, and so on. Then E1, E2 . . . , and EN are inputted into the transformer neural network to obtain corresponding text features T1, T2 . . . , and TN, and then the text features T1, T2 . . . , and TN are inputted into a neural network formed by a plurality of LSTMs to obtain corresponding type features C1, C2 . . . , and CN. Finally, according to the type features C1, C2 . . . , and CN, a complaint risk label of the recognized text "I come from City A." corresponding to the image is obtained. The complaint risk label may include an empty classification label, a dating fraud risk label, a gambling risk label, a pornography risk label, a transaction dispute risk label, and the like.

In this way, by performing text recognition on the image in the complaint sheet, and inputting the recognized text corresponding to the image into the pre-trained neural network model, a complaint effectiveness label and a complaint risk label of the recognized text corresponding to the image are obtained, thereby implementing automated processing of the complaint sheet, saving the labor cost of manual examination of the complaint sheet, and improving the processing efficiency of the complaint sheet through the automated processing, to process the harmful complaint sheet in time to implement stops.

It can be understood that the text contained in the image in the complaint sheet may be transaction content information or communication content before a transaction. Therefore, in the embodiments of the present disclosure, the malice of merchants and the transaction category of the merchants can be effectively recognized, to obtain the complaint effectiveness label and the complaint risk label of the recognized text corresponding to the image, and implement the automated processing of the complaint sheet.

Moreover, the present disclosure can implement the accurate recognition of the text of the image, thereby reducing the loss of effective information in complaint pictures and improving the accuracy and rationality of the automated processing of the complaint sheet.

In an application scenario, pornography, gambling, drug abuse, and fraud cases exist on online payment all the time, and how to obtain effective information to recognize and crack down on abnormal merchants is a major issue. When users notice abnormalities in transactions, they make a complaint, and complaint pictures in the complaint sheet submitted by the users may contain a lot of text information. Therefore, in the present disclosure, in the present disclosure scenario, the malice of merchant and the transaction categories of the merchants can be effectively recognized, to obtain a complaint effectiveness label and a complaint risk label of the recognized text corresponding to the image, and implement the automated processing of the complaint sheet, which facilitates the accurate, timely, and comprehensive cracking down on black industries.

Figure 16:
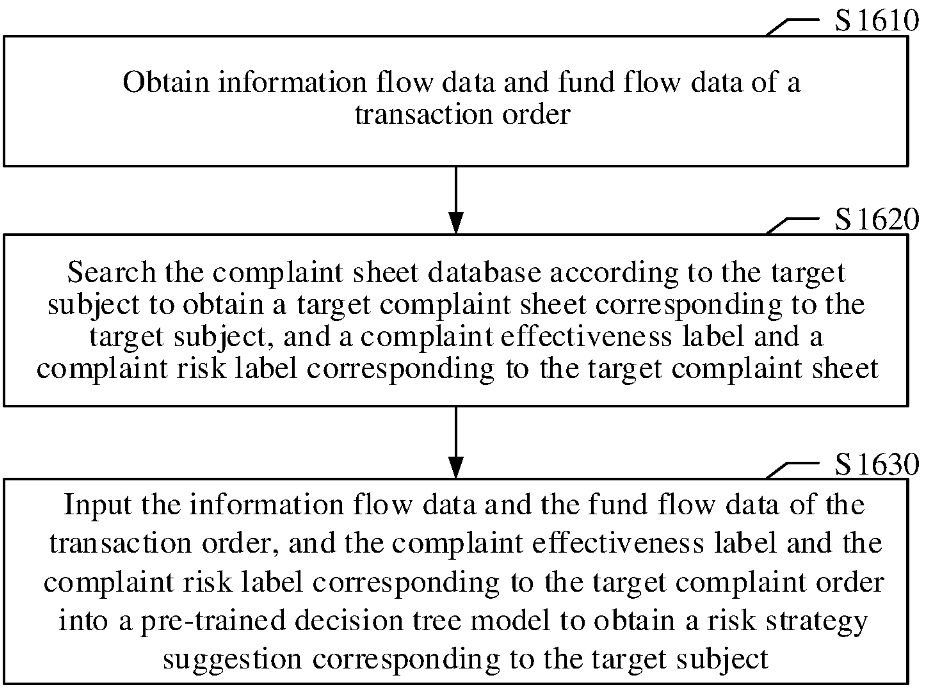
FIG. 16 is a flowchart of exemplary steps after storing a complaint effectiveness label and a complaint risk label corresponding to a complaint sheet and a subject corresponding to the complaint sheet into a complaint sheet database according to an embodiment of the present disclosure.

FIG. 16 schematically shows a flowchart of steps after storing a complaint effectiveness label and a complaint risk label corresponding to a complaint sheet and a subject corresponding to the complaint sheet into a complaint sheet database according to an embodiment of the present disclosure. As shown in FIG. 16, based on the foregoing embodiments, after the storing a complaint effectiveness label and a complaint risk label corresponding to a complaint sheet and a subject corresponding to the complaint sheet into a complaint sheet database in step S1320, the method may further include the following step S1610 to step S1630.

S1610. Obtain information flow data and fund flow data of a transaction order, where the transaction order corresponds to a target subject.

S1620. Search the complaint sheet database according to the target subject to obtain a target complaint sheet corresponding to the target subject, and a complaint effectiveness label and a complaint risk label corresponding to the target complaint sheet.

S1630. Input the information flow data and the fund flow data of the transaction order, and the complaint effectiveness label and the complaint risk label corresponding to the target complaint sheet into a pre-trained decision tree model to obtain a risk strategy suggestion corresponding to the target subject, where the risk strategy suggestion includes one or more of trusting the transaction order, limiting the amount of the transaction order, penalizing the transaction order, intercepting the transaction order, or warning a transaction risk.

Figure 17:
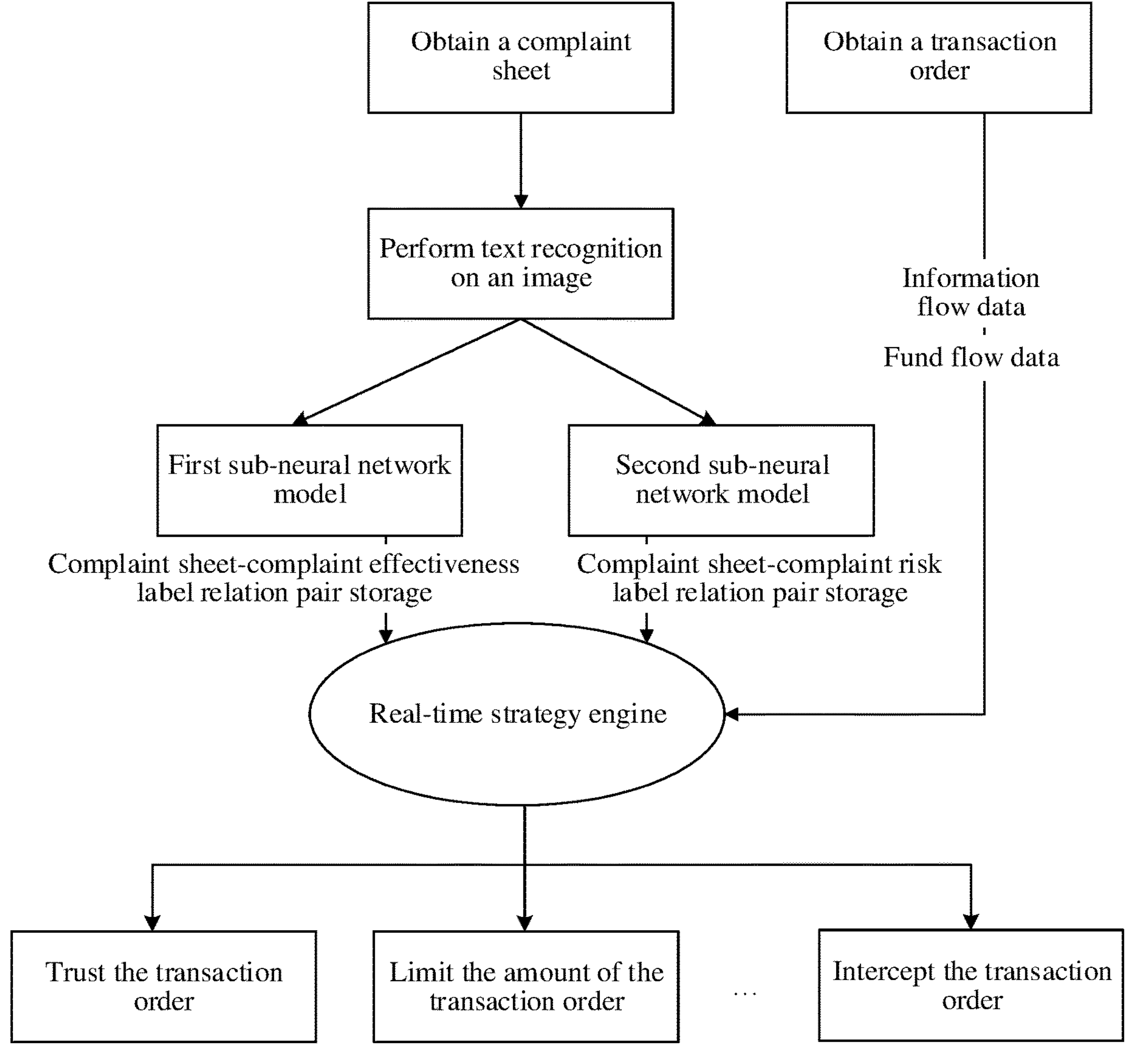
FIG. 17 is a schematic diagram of a process of obtaining a risk strategy suggestion corresponding to a target subject according to an embodiment of the present disclosure.

FIG. 17 schematically shows a schematic diagram of a process of obtaining a risk strategy suggestion corresponding to a target subject according to an embodiment of the present disclosure. As shown in FIG. 17, after the complaint sheet is obtained and text recognition is performed on an image in the complaint sheet, the recognized text corresponding to the image is inputted into the first sub-neural network model to obtain the complaint effectiveness label of the recognized text corresponding to the image. The recognized text corresponding to the image is inputted into the second sub-neural network model to obtain the complaint risk label of the recognized text corresponding to the image. Then, the complaint effectiveness label and the complaint risk label corresponding to the complaint sheet and the subject corresponding to the complaint sheet are stored into the complaint sheet database.

A real-time strategy engine may obtain information flow data and fund flow data of a transaction order in real time, and search the complaint sheet database according to the target subject corresponding to the transaction order, to obtain a target complaint sheet corresponding to the target subject, and a complaint effectiveness label and a complaint risk label corresponding to the target complaint sheet. Finally, the information flow data and the fund flow data of the transaction order, and the complaint effectiveness label and the complaint risk label corresponding to the target complaint sheet are inputted into a pre-trained decision tree model or score card model in the real-time strategy engine to obtain a risk strategy suggestion corresponding to the target subject, where the risk strategy suggestion includes one or more of trusting the transaction order, limiting the amount of the transaction order, penalizing the transaction order, intercepting the transaction order or warning a transaction risk.

Specifically, according to different types of risk labels of target subjects corresponding to transaction orders, automatic penalty with different gradients may be performed. More serious processing strategies such as disabling payment authority and penalizing funds may be performed for merchants with more complaint effective labels, and less severe processing strategies such as quota restriction for merchants with less complaint effective labels or intercepting and warning abnormal orders in merchants may be performed, thereby implementing risk control for real-time transactions.

In this way, the complaint effectiveness label and the complaint risk label corresponding to the complaint sheet and the subject corresponding to the complaint sheet are stored into the complaint sheet database, to search the complaint sheet database according to the target subject to obtain the target complaint sheet corresponding to the target subject, and the complaint effectiveness label and the complaint risk label corresponding to the target complaint sheet. Then the information flow data and the fund flow data of the transaction order, and the complaint effectiveness label and the complaint risk label corresponding to the target complaint sheet are inputted into the pre-trained decision tree model to obtain the risk strategy suggestion corresponding to the target subject, so that an automated processing strategy can be generated based on the multi-category risk label, the complaint effectiveness label, and other transaction information of the merchant, which is beneficial to establishing a gradient penalty system for abnormal merchants and implementing the automated processing of abnormal transaction orders.

Figure 18:
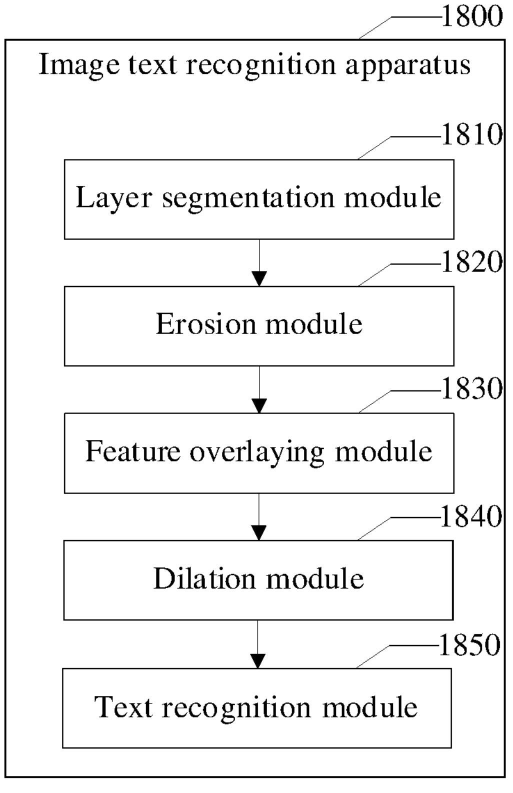
FIG. 18 is a structural block diagram of an image text recognition apparatus according to an embodiment of the present disclosure.

The following describes apparatus embodiments of the present disclosure, and the apparatus embodiments may be used for performing the image text recognition method in the foregoing embodiments of the present disclosure. FIG. 18 schematically shows a structural block diagram of an image text recognition apparatus according to an embodiment of the present disclosure. As shown in FIG. 18, the image text recognition apparatus 1800 includes:

a layer segmentation module 1810, configured to convert an image for processing into a grayscale image, and segment, according to layer intervals to which grayscale values of pixels in the grayscale image belong, the grayscale image into grayscale layers corresponding to each layer interval, the layer interval being used for representing a grayscale value range of pixels in the corresponding grayscale layers;

an erosion module 1820, configured to perform image erosion on each grayscale layer to obtain a feature layer corresponding to each grayscale layer, the feature layer including at least one connected region, and the connected region is being a region formed by a plurality of connected pixels;

a feature overlaying module 1830, configured to overlay each feature layer to obtain an overlaid feature layer, the overlaid feature layer including a plurality of connected regions;

a dilation module 1840, configured to dilate each connected region on the overlaid feature layer according to a preset direction to obtain each text region; and a text recognition module 1850, configured to perform text recognition on each text region on the overlaid feature layer to obtain a recognized text corresponding to the image.

In some embodiments of the present disclosure, based on the foregoing embodiments, the image text recognition apparatus further includes:

a minimum determining unit, configured to determine, according to grayscale values of pixels in the grayscale image, one or more minimums in distribution frequencies of the grayscale values in the grayscale image;

a full value range determining unit, configured to determine a minimum value of a full value range according to a minimum grayscale value of the grayscale image; and determine a maximum value of the full value range according to a maximum grayscale value of the grayscale image; and a layer interval obtaining unit, configured to segment the full value range into a plurality of layer intervals according to a grayscale value corresponding to each minimum.

In some embodiments of the present disclosure, based on the foregoing embodiments, the layer interval obtaining unit includes:

a sorting subunit, configured to sort the minimum value of the full value range, the maximum value of the full value range, and the grayscale value corresponding to each minimum in an ascending or descending order; and a layer interval segmentation subunit, configured to segment the full value range by using two grayscale values adjacent in order as two interval endpoints corresponding to the layer interval, to obtain a plurality of layer intervals that are connected end to end and do not overlap.

In some embodiments of the present disclosure, based on the foregoing embodiments, the minimum determining unit includes:

a distribution frequency determining subunit, configured to calculate, according to grayscale values of pixels in the grayscale image, distribution frequencies of the grayscale values;

a distribution function obtaining subunit, configured to obtain a corresponding distribution function according to the distribution frequencies of the grayscale values in the grayscale image;

a smooth curve obtaining subunit, configured to perform function smoothing on the distribution function to obtain a smooth curve corresponding to the distribution function; and a minimum obtaining subunit, configured to recognize each trough of a smooth curve, and use a value of a point corresponding to each trough as the minimum in the distribution frequencies of the grayscale values in the grayscale image.

In some embodiments of the present disclosure, based on the foregoing embodiments, the erosion module includes:

a binary image obtaining unit, configured to determine a target threshold in a grayscale value interval of the grayscale layer, and correspond a grayscale value greater than or equal to the target threshold in the grayscale layer to a first value and correspond a grayscale value less than the target threshold in the grayscale layer to a second value, to form a binary layer corresponding to the grayscale layer;

a marked connected-region obtaining unit, configured to perform image erosion on the binary layer to obtain a marked connected-region formed by a plurality of pixels whose grayscale value is the first value; and an erosion unit, configured to retain pixel values located in the marked connected-region in the grayscale layer, and discard pixel values located outside the marked connected-region in the grayscale layer.

In some embodiments of the present disclosure, based on the foregoing embodiments, the preset direction is a horizontal direction or a vertical direction, and the erosion module includes:

a circumscribed rectangle obtaining unit, configured to obtain a circumscribed rectangle of the connected region and dilate the connected region to fill the circumscribed rectangle, where the circumscribed rectangle is a rectangle circumscribed with the connected region in the preset direction;

a nearest connected-region obtaining unit, configured to obtain a nearest connected-region of the connected region, where the nearest connected-region is a connected region with a shortest interval distance from the connected region; and a text region obtaining unit, configured to dilate, when a direction of the nearest-connected region corresponding to the connected region is the preset direction, the connected region in the direction of the nearest connected-region to obtain the text region.

In some embodiments of the present disclosure, based on the foregoing embodiments, the text recognition module includes:

a text cutting unit, configured to perform text cutting on the text region to obtain one or more single-word regions;

a character recognition unit, configured to perform character recognition on each single-word region to obtain character information corresponding to each single-word region;

a text information obtaining unit, configured to combine the character information corresponding to each single-word region according to an arrangement position of each single-word region in the text region to obtain text information corresponding to the text region; and a recognized text obtaining unit, configured to obtain a recognized text corresponding to the image according to the text information corresponding to each text region.

In some embodiments of the present disclosure, based on the foregoing embodiments, the text cutting unit includes:

a length-to-height ratio calculation subunit, configured to calculate a length-to-height ratio of the text region, where the length-to-height ratio is a ratio of a length of the text region to a height of the text region;

a character estimation subunit, configured to calculate an estimated quantity of characters of the text region according to the length-to-height ratio; and a single-word region obtaining subunit, configured to perform uniform cutting on the text region in a length direction according to the estimated quantity to obtain the estimated quantity of single-word regions.

In some embodiments of the present disclosure, based on the foregoing embodiments, the single-word region obtaining subunit includes:

a pre-cut quantity obtaining subunit, configured to obtain a pre-cut quantity according to the estimated quantity, where the pre-cut quantity is greater than or equal to the estimated quantity;

a cutting line uniform arrangement subunit, configured to perform uniform arrangement on candidate cutting lines in the length direction of the text region according to the pre-cut quantity, where the candidate cutting lines are used for performing uniform cutting on the text region in the length direction to obtain a candidate region with the pre-cut quantity;

a target cutting line obtaining subunit, configured to use a candidate cutting line with adjacent cutting lines on both sides as a target cutting line;

a distance sum calculation subunit, configured to detect a distance sum of distances between the target cutting lines and the adjacent candidate cutting lines on both sides;

a target cutting line retaining subunit, configured to retain the target cutting line when the ratio of the distance sum to the height of the text region is greater than or equal to a preset ratio; and a target cutting line discarding subunit, configured to discard the target cutting line when the ratio of the distance sum to the height of the text region is less than the preset ratio.

In some embodiments of the present disclosure, based on the foregoing embodiments, the feature overlaying module includes:

an overlaid feature layer obtaining unit, configured to overlay each feature layer to obtain an overlaid feature layer;

a combined connected-region obtaining unit, configured to combine the connected regions whose interval distance is less than a preset distance on the overlaid feature layer into a combined connected-region;

an area ratio calculation unit, configured to determine an area of the connected region from each feature layer in the combined connected-region and calculate a corresponding area ratio of each feature layer, where the area ratio is a ratio of an area of the connected region at the corresponding position in the feature layer to an area of the combined connected-region; and a connected region replacement unit, configured to replace the combined connected-region with the connected region at the corresponding position in the feature layer with a maximum area ratio.

In some embodiments of the present disclosure, based on the foregoing embodiments, the apparatus is applied to automated processing of a complaint sheet and the image includes an image in the complaint sheet; and the image text recognition apparatus further includes:

a label classification unit, configured to input the recognized text corresponding to the image into a pre-trained neural network model to obtain a complaint effectiveness label and a complaint risk label corresponding to a complaint sheet to which the image belongs; and a complaint sheet database storage unit, configured to store the complaint effectiveness label and the complaint risk label corresponding to the complaint sheet and a subject corresponding to the complaint sheet into a complaint sheet database.

In some embodiments of the present disclosure, based on the foregoing embodiments, the image text recognition apparatus further includes:

a transaction data obtaining unit, configured to obtain information flow data and fund flow data of a transaction order, where the transaction order corresponds to a target subject;

a label search unit, configured to search the complaint sheet database according to the target subject to obtain a target complaint sheet corresponding to the target subject, and a complaint effectiveness label and a complaint risk label corresponding to the target complaint sheet; and a risk strategy suggestion obtaining unit, configured to input the information flow data and the fund flow data of the transaction order, and the complaint effectiveness label and the complaint risk label corresponding to the target complaint sheet into a pre-trained decision tree model to obtain a risk strategy suggestion corresponding to the target subject, where the risk strategy suggestion includes one or more of trusting the transaction order, limiting the amount of the transaction order, penalizing the transaction order, intercepting the transaction order, or warning a transaction risk.

Specific details of the image text recognition apparatus provided in the embodiments of the present disclosure have been described in detail in the corresponding method embodiments, and the details are not described herein again.

Figure 19:
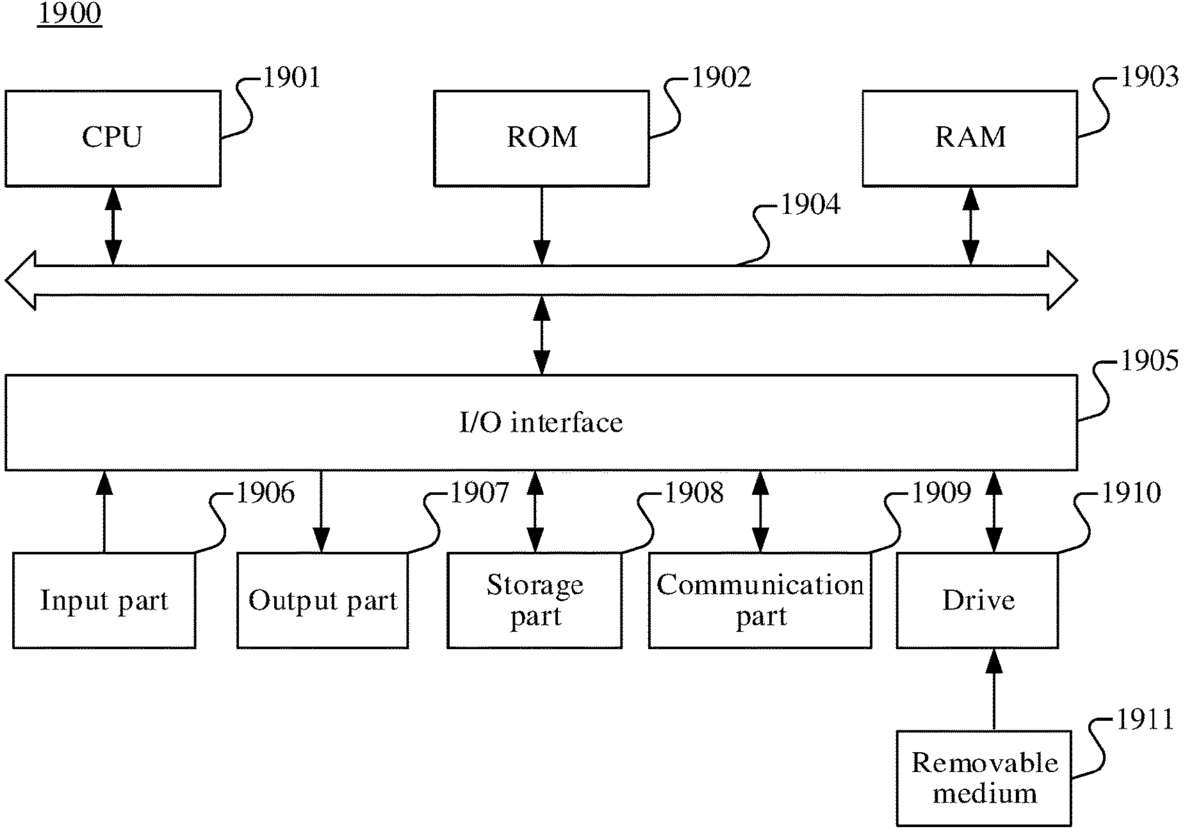
FIG. 19 is a structural block diagram of a computer system for implementing an electronic device according to an embodiment of the present disclosure.

FIG. 19 schematically shows a structural block diagram of a computer system configured to implement an electronic device according to an embodiment of the present disclosure.

The computer system 1900 of the electronic device shown in FIG. 19 is merely an example, and does not constitute any limitation on functions and use ranges of the embodiments of the present disclosure.

As shown in FIG. 19, the computer system 1900 includes a central processing unit (CPU) 1901. The CPU 1101 may perform various appropriate actions and processing according to a program stored in a read-only memory (ROM) 1902 or a program loaded from a storage portion 1908 into a random access memory (RAM) 1903. The RAM 1903 further stores various programs and data required for operating the system. The CPU 1901, the ROM 1902, and the RAM 1903 are connected to each other through a bus 1904. An input/output interface (I/O interface) 1905 is also connected to the bus 1904.

The following components are connected to the I/O interface 1905: an input part 1906 including a keyboard and a mouse, or the like; an output part 1907 including a cathode ray tube (CRT), a liquid crystal display (LCD), a speaker, or the like; a storage part 1908 including hard disk, or the like;

and a communication part 1909 including a network interface card such as a local area network card, a modem, or the like. The communication part 1909 performs communication processing by using a network such as the Internet. A drive 1910 is also connected to the I/O interface 1905 as required. A removable medium 1911, such as a magnetic disk, an optical disc, a magneto-optical disk, or a semiconductor memory, is mounted on the drive 1910 as required, so that a computer program read from the removable medium is installed into the storage part 1908 as required.

Particularly, according to the embodiments of the present disclosure, the processes described in the method flowcharts may be implemented as computer software programs. For example, various embodiments of the present disclosure further include a computer program product, the computer program product includes a computer program carried on a computer-readable medium, and the computer program includes program code used for performing the methods shown in the flowcharts. In such an embodiment, the computer program may be downloaded and installed from a network through the communication part 1909, and/or installed from the removable medium 1911. When the computer program is executed by the CPU 1901, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

It should be understood that the present disclosure is not limited to the precise structures described above and shown in the accompanying drawings, and various modifications and changes can be made without departing from the scope of the present disclosure. The scope of the present disclosure is limited by the appended claims only.

What is claimed is:

1. An image text recognition method, performed by an electronic device, the method comprising:

converting an image for processing into a grayscale image, and segmenting, according to layer intervals to which grayscale values of pixels in the grayscale image belong, the grayscale image into grayscale layers with one corresponding to a layer interval, the layer interval being used for representing a grayscale value range of pixels in a corresponding grayscale layer;

performing image erosion on a grayscale layer to obtain a feature layer corresponding to the grayscale layer, the feature layer comprising at least one connected region, and a connected region being a region formed by a plurality of connected pixels, wherein the connectedness of the pixels is determined based on 8-adjacency between the pixels;

overlaying feature layers to obtain an overlaid feature layer, the overlaid feature layer comprising connected regions;

dilating connected regions on the overlaid feature layer according to a preset direction to obtain text regions, the preset direction comprising at least one of a vertical direction, an oblique direction, or a curve direction; and performing text recognition on the text regions on the overlaid feature layer to obtain a recognized text corresponding to the image, wherein performing the text recognition on the text regions on the overlaid feature layer to obtain the recognized text corresponding to the image comprises: performing text cutting on a text region to obtain one or more single-word regions; performing character recognition on a single-word region to obtain character information corresponding to the single-word region; combining the character information corresponding to the single-word region according to an arrangement position of the single-word region in the text region to obtain text information corresponding to the text region; and obtaining a recognized text corresponding to the image according to the text information corresponding to the text region;

wherein performing the text cutting on the text region to obtain the one or more single-word regions comprises: calculating a length-to-height ratio of the text region, wherein the length-to-height ratio is a ratio of a length of the text region to a height of the text region; calculating an estimated quantity of characters of the text region according to the length-to-height ratio; and performing uniform cutting on the text region in a length direction according to the estimated quantity to obtain the estimated quantity of single-word regions; and wherein performing the uniform cutting on the text region in the length direction according to the estimated quantity to obtain the estimated quantity of single-word regions comprises: obtaining a pre-cut quantity according to the estimated quantity, wherein the pre-cut quantity is greater than or equal to the estimated quantity;

performing uniform arrangement on candidate cutting lines in the length direction of the text region according to the pre-cut quantity, wherein the candidate cutting lines are used for performing uniform cutting on the text region in the length direction to obtain a candidate region with the pre-cut quantity; using a candidate cutting line with adjacent cutting lines on both sides as a target cutting line; detecting a distance sum of distances between the target cutting line and adjacent candidate cutting lines on both sides; and retaining the target cutting line when a ratio of the distance sum to the height of the text region is greater than or equal to a preset ratio; and discarding the target cutting line when the ratio of the distance sum to the height of the text region is less than the preset ratio.

2. The method according to claim 1, further comprising:

determining, according to the grayscale values of the pixels in the grayscale image, one or more minimums in distribution frequencies of the grayscale values in the grayscale image;

determining a minimum value of a full value range according to a minimum grayscale value of the grayscale image; and determining a maximum value of the full value range according to a maximum grayscale value of the grayscale image; and segmenting the full value range into a plurality of layer intervals according to grayscale values corresponding to the one or more minimums.

3. The method according to claim 2, wherein segmenting the full value range into the plurality of layer intervals according to the grayscale values corresponding to the one or more minimums comprises:

sorting the minimum value of the full value range, the maximum value of the full value range, and the grayscale values corresponding to the one or more minimums in an ascending or descending order; and segmenting the full value range by using two grayscale values adjacent in sorted order as two interval endpoints corresponding to the layer interval, to obtain the layer intervals that are connected end to end without overlapping each other.

4. The method according to claim 2, wherein determining, according to the grayscale values of the pixels in the grayscale image, the one or more minimums in distribution frequencies of the grayscale values in the grayscale image comprises:

calculating, according to the grayscale values of the pixels in the grayscale image, the distribution frequencies of the grayscale values;

obtaining a distribution function according to the distribution frequencies of the grayscale values in the grayscale image;

performing function smoothing on the distribution function to obtain a smooth curve corresponding to the distribution function; and recognizing troughs of the smooth curve, and using values of points corresponding to the troughs as the minimums in the distribution frequencies of the grayscale values in the grayscale image.

5. The method according to claim 1, wherein performing the image erosion on the grayscale layer to obtain the feature layer corresponding to the grayscale layer comprises:

determining a target threshold in a grayscale value interval of the grayscale layer, and corresponding a grayscale value greater than or equal to the target threshold in the grayscale layer to a first value and corresponding a grayscale value less than the target threshold in the grayscale layer to a second value, to form a binary layer corresponding to the grayscale layer;

performing image erosion on the binary layer to obtain a marked connected-region formed by a plurality of pixels whose grayscale value is the first value; and retaining pixel values located in the marked connected-region in the grayscale layer, and discarding pixel values located outside the marked connected-region in the grayscale layer.

6. The method according to claim 1, wherein the preset direction is the vertical direction, and dilating the connected regions on the overlaid feature layer according to the preset direction to obtain the text regions comprises:

obtaining a circumscribed rectangle of the connected region and dilating the connected region to fill the circumscribed rectangle, wherein the circumscribed rectangle is a rectangle circumscribed with the connected region in the preset direction;

obtaining a nearest connected-region of the connected region, wherein the nearest connected-region is a connected region with a shortest interval distance from the connected region; and dilating, when a direction of the nearest connected-region corresponding to the connected region is the preset direction, the connected region toward a direction of the nearest connected-region to obtain the text region.

7. The method according to claim 1, wherein overlaying the feature layers to obtain the overlaid feature layer comprises:

overlaying a feature layer to obtain an overlaid feature layer;

combining connected regions whose interval distance is less than a preset distance on the overlaid feature layer into a combined connected-region;

determining an area of the connected region from the feature layer in the combined connected-region and calculating a area ratio of the feature layer correspondingly, wherein the area ratio is a ratio of an area of the connected region at a corresponding position in the feature layer to an area of the combined connected-region; and replacing the combined connected-region with the connected region at the corresponding position in the feature layer with a maximum area ratio.

8. The method according to claim 1, wherein the method is applied to automated processing of a complaint sheet and the image comprises an image in the complaint sheet; and the method further comprises:

inputting the recognized text corresponding to the image into a pre-trained neural network model to obtain a complaint effectiveness label and a complaint risk label corresponding to a complaint sheet to which the image belongs; and storing the complaint effectiveness label and the complaint risk label corresponding to the complaint sheet and a subject corresponding to the complaint sheet into a complaint sheet database.

9. The method according to claim 8, further comprising:

obtaining information flow data and fund flow data of a transaction order, wherein the transaction order corresponds to a target subject;

searching the complaint sheet database according to the target subject to obtain a target complaint sheet corresponding to the target subject, and a complaint effectiveness label and a complaint risk label corresponding to the target complaint sheet; and inputting the information flow data and the fund flow data of the transaction order, and the complaint effectiveness label and the complaint risk label corresponding to the target complaint sheet into a pre-trained decision tree model to obtain a risk strategy suggestion corresponding to the target subject, wherein the risk strategy suggestion comprises one or more of trusting the transaction order, limiting an amount of the transaction order, penalizing the transaction order, intercepting the transaction order, or warning a transaction risk.

* * * * *